United States Patent [19]
Hiromoto

[11] Patent Number: 5,123,203
[45] Date of Patent: Jun. 23, 1992

[54] METHOD FOR CULTURE OF FUNGI INCLUDING SHIITAKE (LENTINUS EDODES)

[75] Inventor: Bryan Hiromoto, Pukalani, Hi.

[73] Assignee: Maui Shiitake Trading Company, Inc., Pukalani, Hi.

[21] Appl. No.: 686,006

[22] Filed: Apr. 12, 1991

Related U.S. Application Data

[63] Continuation of Ser. No. 374,270, Jun. 24, 1989, abandoned.

[51] Int. Cl.$^5$ .............................................. A01G 1/04
[52] U.S. Cl. ............................................ 47/1.1; 71/5; 435/254; 435/911
[58] Field of Search .................. 47/1.1; 71/5; 435/254

[56] References Cited

U.S. PATENT DOCUMENTS

| | | | |
|---|---|---|---|
| 2,520,318 | 8/1950 | Lescarboura | 71/5 |
| 3,335,521 | 8/1967 | Sohm | 47/1.1 |
| 4,127,965 | 12/1978 | Mee | 71/5 |
| 4,542,608 | 9/1985 | Tan | 47/1.1 |
| 4,637,163 | 1/1987 | Pellinen | 47/1.1 |
| 4,674,228 | 6/1987 | Murata | 47/1.1 |
| 4,722,154 | 2/1988 | Watanabe | 47/1.1 |
| 4,735,014 | 4/1988 | Weber | 47/1.1 |
| 4,741,122 | 5/1988 | Becsy | 47/1.1 |
| 4,757,640 | 7/1988 | Ower et al. | 47/1.1 |
| 4,852,297 | 8/1989 | Moren | 47/1.1 |
| 4,873,195 | 10/1989 | Kubo et al. | 435/254 |

FOREIGN PATENT DOCUMENTS

| | | | |
|---|---|---|---|
| 3442536 | 5/1982 | Fed. Rep. of Germany | 47/1.1 |
| 0254395 | 2/1988 | Fed. Rep. of Germany | 435/254 |
| 121955 | 4/1976 | Japan | 47/1.1 |
| 134895 | 6/1976 | Japan | 47/1.1 |
| 188042 | 9/1985 | Japan | 435/254 |
| 0643120 | 1/1979 | U.S.S.R. | 47/1.1 |
| 2181122 | 4/1987 | United Kingdom | 47/1.1 |

OTHER PUBLICATIONS

Royse, D. J., "Factors Influencing the Production Rate of Shiitake", *Mushroom Journal for the Tropics*, vol. 9, No. 4 (Oct. 1989).

San Antonio, J. P., "A Laboratory Method to Obtain Fruit from Cased Grain Spawn of the Cultivated Mushroom, *Agaricus bisporus*", *Mycologia*, vol. 63, No. 1, Jan.-Feb. 1971, pp. 16-21.

Jong, S., "Commercial Cultivation of the Shiitake Mushroom on Supplemented Sawdust", *Mushroom Journal for the Tropics*, vol. 9, pp. 89-98 (1989).

Royse, D. J., Schisler, L. C. & Wuest, P. J., "Spawning to Casing in Commerical Mushroom Production", *Penn State Handbook for Commercial Mushroom Growers* (1982) p. 43-48.

Elliott, T. J., "Spawn-Making and Spawns", *The Biology and Technology of the Cultivated Mushroom* (1985) p. 131-139.

Collins, C. H. & Lyne, P. M., Microbiological Methods, 4th ed., 1976, p. 84.

Difio Laboratories, *Difio Manual*, 1953.

Chalmers, W., "Space-Bag Culture of Exotic Mushrooms", *Shiitake News*, Aug. 1988, pp. 11-13.

Stamets, P. & Chilton, J. S., *The Mushroom Cultivator*, pp. 176-179 (1983) and pp. 42-59 (esp. p. 54).

(List continued on next page.)

*Primary Examiner*—James R. Feyrer
*Attorney, Agent, or Firm*—Martin E. Hsia

[57] ABSTRACT

An improved substrate for mushrooms that is essentially cellulose-free comprising a major portion of grain and minor portions of nutritional supplements. The grain is partially sterilized by boiling in order to kill bacteria, cooled in order to induce germination of the heat resistant spores, and steam sterilized before the germinated spores have matured sufficiently to create new spores. The substate can be used to grow fungi, including mushrooms, especially shiitake.

24 Claims, 1 Drawing Sheet

OTHER PUBLICATIONS

Han, Y. H., et al., "Physiology and Ecology of *Lentinus edodes*(Berk.) Sing.", *Mushroom Science XI*, 1981, pp. 623-659.

Chung, S. T., & Quimie, T. H., *Tropical Mushrooms: Biological Nature and Cultivation Methods*, pp. 37-45 (1982).

U.S. Dept. Agriculture, "A Small-Scale Agriculture Alternative Mushroom", 1987.

Campbell, A. C., & Slee, R. W., "Commercial Cultivation of Shiitake in Taiwan and Japan", Mushroom Journal for the Tropics, p. 129 (1987).

Oss, O. T. & Oeric, O. N., *Psilocybin-Magic Mushroom Grower's Guide*, pp. 33-45 (1976).

Tan, Y. H. and Chang, S. T., "Yield and Mycelial Growth Response to the Shiitake Mushroom, *Lentinus edodes* (Berk.) Sing. to Supplementation on Sawdust Media", *Mushroom Journal for the Tropics*, vol. 9, pp. 1-14, 1989.

Chantarasnit, Aruni, "Factors Affecting Contamination in Plastic Bag Cultivation of the Black Mushroom (*Lentinus edodes*)", *Mushroom Journal for Magics*, vol. 9, p. 1 (1989).

Anon. "Directions for Growing Oyster Mushroom" (*Memio from*) (provided by Professor Neil A. Anderson, University of Minnesota Nov. 9, 1973) single page.

San Antonio, J. P. "Cultivation of Shiitake Mushroom" *Hort Science*, vol. 16(2) Apr. 1981, pp. 151-154.

METHOD FOR CULTURE OF FUNGI INCLUDING SHIITAKE (*LENTINUS EDODES*)

This is a continuation of copending application Ser. No. 07/374,270 filed on Jun. 29, 1989, now abandoned.

BACKGROUND OF THE INVENTION

This invention relates to the cultivation of mushrooms and other fungi, especially shiitake (*Lentinus edodes*).

Inventors have long sought a method for efficiently and quickly cultivating fungi, especially Shiitake, because of its great demand and relatively limited supply.

Shiitake and other mushrooms are usually cultivated on logs or in cellulose based substrates. Among the methods using a cellulose based substrate are those described in U.S. Pat. No. 4,127,965 to Mee and U.S. Pat. No. 4,637,163 to Pellinen. Mee also teaches the use of a cellulose based substrate in a microorganism impermeable flexible container which is then sealed and sterilized. However, as taught by U.S. Pat. No. 4,674,228 issued to Murata, removal of the mycelium from such containers often causes damage that reduces productivity. Other methods also have been tried. For example, U.S. Pat. No. 4,735,014 to Weber teaches the use of hemp stalks and U.S. Pat. No. 4,741,122 to Becsy teaches the use of agricultural wastes.

There are many drawbacks to the various methods for growing shiitake currently in use. Growing shiitake on logs in the traditional manner is slow and inefficient. Cultivation of shiitake in microorganism impermeable flexible containers (commonly known as "space bags") offers advantages over traditional methods, but still does not provide a satisfactory production rate.

Thus, it is an object of this invention to provide an improved method of cultivating fungi, especially shiitake.

It is a further object of this invention to provide an improved culture medium for the culture of fungi, including shiitake.

It is a further object of this invention to provide a more efficient and faster method of raising fungi, including shiitake.

SUMMARY OF THE INVENTION

The invention is a new substrate for the growth of fungi, especially shiitake, created using a new method of sterilizing the substrate to allow cultivation of the desired fungi without contamination by competing organisms.

The new substrate is grain that is essentially cellulose free and that has been sterilized in accordance with the process described herein. As indicated above, the prior art in the growth of mushrooms and other fungi requires growth on logs, sawdust or other substrates containing a major portion of cellulose. However, cellulose is not necessary for the cultivation of shiitake. Shiitake mushrooms have the ability to break down cellulose for essential nutrients, but can be more efficiently grown in a substrate containing these materials in an already usable form. Similarly, shiitake can break down lignin, which is a constituent of wood, but again shiitake can be cultivated more efficiently by providing the breakdown products instead of the lignin.

Prior art references have taught the use of grain as a nutritional supplement in a cellulose based substrate. See for example, Han, et. al, *Physiology and Ecology of Lentinus Edodes (Berk) sing.*, Mushroom Science XI, Proceedings of the Eleventh International Scientific Congress on the Cultivation of Edible Fungi (1981). However, the substrate of this invention is essentially free of cellulose and the grain itself is the substrate.

The grain substrate must be sterilized for the cultivation of fungi, including shiitake. Unsterilized grain contains various bacteria and microorganisms that compete with mushrooms and other fungi and therefore reduce production efficiency. Further, conventional heat sterilization techniques, such as steam sterilization, are insufficient to sterilize the grain against all competing microorganisms. Accordingly, conventionally sterilized grain is unsuitable as a substrate. In fact, one prior art reference states that, in view of the well-established use of tree logs and the amount of energy necessary to sterilize a substrate, "widespread large scale use of any sterilized substrate to produce shiitake mushroom appears unlikely." San Antonio, "Cultivation of the Shiitake Mushroom", *Hortscience.* Vol. 16(2), Apr. 1981.

The main problem with conventional heat sterilization of grain substrates is that certain bacteria, primarily of the genus Bacillus, form heat resistant spores that will survive such sterilization even though the bacteria themselves are killed. Accordingly, even though a grain substrate may be conventionally heat sterilized, it will still contain spores of Bacillus bacteria which will contaminate the substrate and render it unsuitable for production of fungi, including shiitake. This invention solves the problem of bacterial contamination in the grain so that an appropriately sterile substrate is provided.

In the invention, the substrate is boiled to kill the bacteria that are present. The substrate is then cooled to induce any heat resistant spores to germinate. The substrate then is steam sterilized after such germination, but before the bacteria have matured sufficiently to form heat-resistant spores.

Of course, non-heating methods of sterilizing the grain substrate also can be used, such as irradiation. However, irradiation of the substrate would require greater governmental regulation and may affect marketability of the resulting mushrooms.

The substrate of the invention thus provides a more efficient medium for cultivation of mushrooms, including shiitake, because the nutrients required by the mushrooms are furnished directly, rather than being furnished in the form of cellulose and lignin that must be enzymatically broken down by the mushrooms. The invention also provides a more efficient method of cultivating mushrooms because competing microorganisms, including bacteria, are eliminated from the substrate.

An advantage of the invention is the shortening of incubation times for the shiitake. The invention shortens the incubation time for forming mycelium to 21 days, as opposed to log cultivation, which requires 8 months to 1 year for incubation, and sawdust based substrates, which require approximately 80 days for incubation.

A further advantage of the invention is the increase in yield per pound of substrate. One hundred pounds of the substrate of the invention yields approximately 300 pounds of shiitake within 5 months. By comparison, 100 pounds of logs yields approximately 10 to 15 pounds of shiitake over more than 3 years, and 100 pounds of sawdust based substrate yields approximately 80 pounds of shiitake over 8 months.

A further advantage of the invention is that no special spawn material is necessary. The same material used for fruiting can be used as a spawn material to start new production units, so that production can be increased immediately instead of waiting for new spawn to be grown. Similarly, no spawn is wasted if production is decreased.

A still further advantage of the invention is that production units may be kept in incubation beyond the 21 day period for up to 6 months if, for example, market conditions are unfavorable. This also allows stockpiling of colonized units for large seasonal production outputs.

In the practice of the invention, various nutritional supplements (including proteins, sugars, starches and vitamins) are boiled in water until they are dispersed throughout the mixture. The grain for the substrate is then added and boiled for approximately one hour in order to kill the bacteria present and cause the absorption of the dispersed nutritional supplements into the grain. The grain is then allowed to cool to induce germination of any heat-resistant spores. While the grain is cooling, it is mixed with permeability enhancing powders to prevent caking and packed into microorganism impermeable sterilizable containers, such as polypropylene bags. The bags are then steam sterilized in accordance with conventional practice before the germinated bacteria have matured sufficiently to form spores.

After sterilization of the bags, colonization of the bags is accomplished by introducing either pure spawn of the desired fungi or by introducing previously colonized grain. The bags are then shaken to mix the spawn or previously colonized grain with the grain in order to decrease the incubation time. The bags are then incubated for approximately three weeks at approximately 80 degrees Fahrenheit. During this time, the spawn will digest most, if not all, of the substrate to form a mycelium.

The mycelium can then be induced to fruit by subjecting the bags to a cold shock of 40 to 65 degrees Fahrenheit for 5 to 15 days under cool white fluorescent lighting. After the cold shock, fruiting to maturation is accomplished by removing the mycelium from the containers and exposing them to an intermittent chilled water mist, or otherwise placing the mycelium in a high humidity environment.

Alternatively, fruiting can be induced using only a cold water spray under lighted conditions.

DETAILED DESCRIPTION OF A PREFERRED EMBODIMENT

Figure 1:
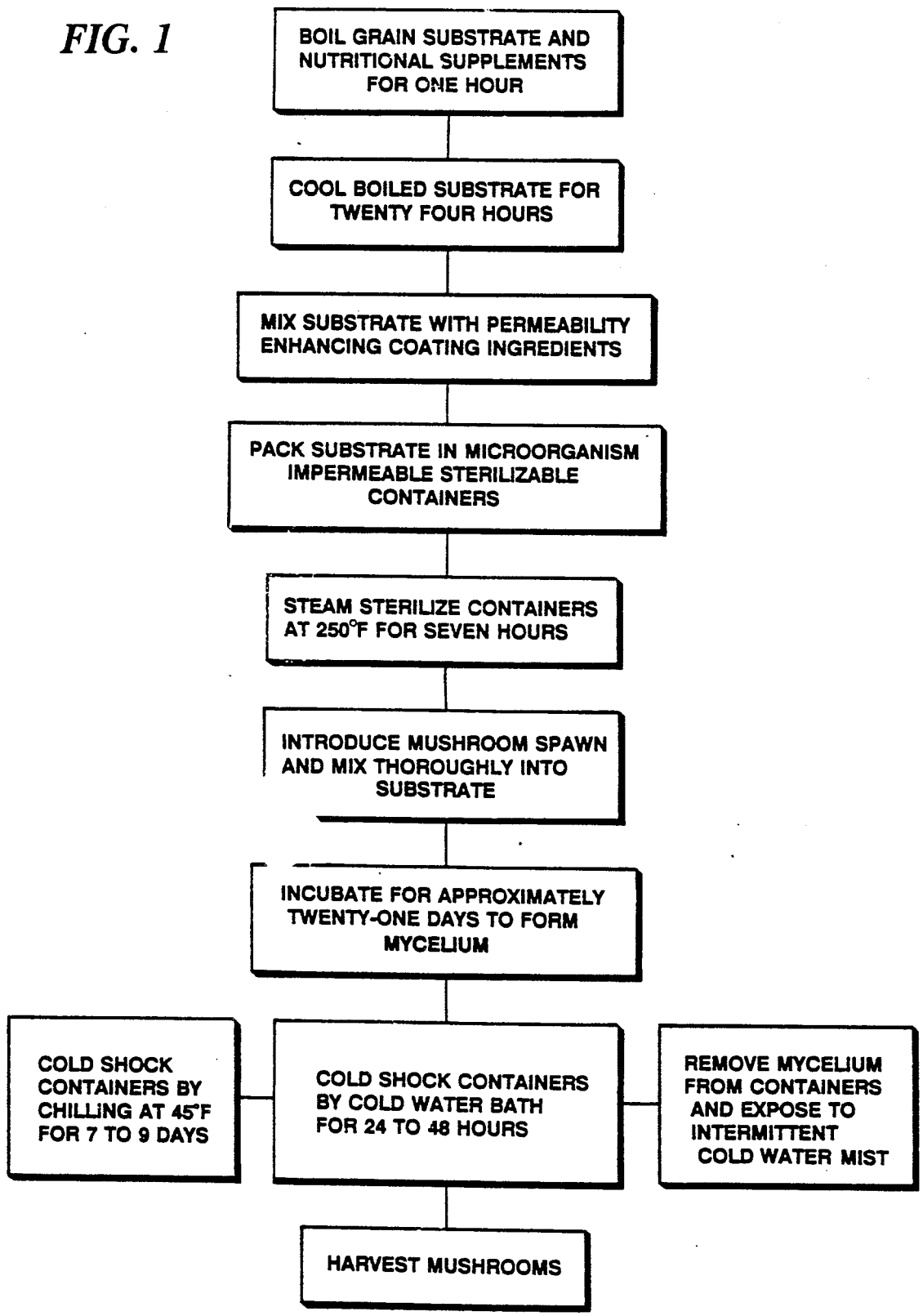
FIG. 1 is a flow chart of a preferred method of preparing the substrate of the invention.

FIG. 1 of the drawings sets forth generally a preferred method of preparing the substrate of the invention.

The ingredients in the substrate are preferably chosen to provide optimum nutrition for the fungi to be grown without requiring additional artificial supplements. This use of all-natural materials therefore makes sale and marketing of the cultivated fungi easier because fewer regulatory requirements are imposed. The preferred ingredients, their ranges and the optimum amounts are set forth below for preparing batches of the substrate.

| Ingredient | Range | Optimum Amount |
|---|---|---|
| Whole Sorghum grain | 150–300 lbs | 200 |
| Whole Oat grain | 0–50 lbs | 35 |

-continued

| Ingredient | Range | Optimum Amount |
|---|---|---|
| Russet Potatoes | 5–20 lbs | 10 |
| Rolled Barley grain | 0.5–15 lbs | 5 |
| Maple pea sprouts | 0–15 lbs | 5 |
| Brewer's yeast powder | 2–35 lbs | 6 |
| Hulled sunflower seed | 0–10 lbs | 2 |
| Soybean meal | 0–2.5 lbs | 1.5 |
| Corn gluten meal | 0–2.5 lbs | 1.5 |
| Whole Garlic | 0.5–4 lbs | 1.5 |
| Sunflower oil | 0–20 tablespoons | 10 |
| Wheat germ oil | 0–20 tablespoons | 10 |
| Molasses | 0–20 tablespoons | 6 |
| Water | 20–35 gallons | 25 |
| Milk | 0–1 gallon | .25 |

The preferred coating ingredients, the ranges and the optimum for every two batches of the above substrate are set forth below:

| Limestone powder | 25–75 lbs | 50 |
|---|---|---|
| Gypsum powder | 100–200 lbs | 160 |
| Cottonseed meal | 0–60 lbs | 40 |

The maple pea sprouts are preferably grown for 6 to 12 days under a mist system. Commercial bean sprouts may also be used, but more roots and larger cotyledons are available with maple pea sprouts.

Sorghum provides vitamins, carbohydrates, starches, protein and minerals such as Copper, Iron, Manganese, Zinc and Selenium. Oats provide vitamines, minerals, carbohydrates, starches, proteins and silicyclic acid. Salicylic acid promotes shiitake fruiting. Rolled barley grain provides vitamins and carbohydrates and absorbs excess water. Soybean meal provides a source of minerals, proteins and vitamins. Brewer's yeast powder provides high amounts of vitamins, especially B vitamins that promote mycelial growth. Sunflower seed and sunflower oil provide vitamins, minerals, proteins and saturated and unsaturated oils. The sunflower seed and oil also promote heavier secondary mycelial growth.

The pea sprouts promote a heavier amount of fruitings to occur. This allows some control over the size of the mushrooms. More sprouts allow for more mushrooms to form but the mushrooms are smaller in size. Fewer sprouts allow for fewer mushrooms to form but the mushrooms are larger in size. With no sprouts added, mushrooms with individual weights of from ¾ lb. to 1½ lbs may form on the substrate.

Garlic provides natural antibacterial action in order to resist bacterial growth after boiling and sterilization of the substrate. Molasses provides sugars and wheat germ oil provides saturated and unsaturated oils as well as vitamin D. Corn gluten meal provides vitamins, minerals, protein and selenium. Potatoes provide starch. Milk provides cassein and cheese can be substituted instead of milk.

The coating ingredients serve additional functions besides increasing permeability of the substrate. Limestone powder adjusts the pH of the substrate to neutral (approximately 7 to 8). The gypsum powder also provides long term pH maintenance and makes the grain substrate loose and powdery. The cottonseed meal provides protein and oil.

It should be noted that the prior art teaches that, under certain conditions, calcium inhibits fruiting of mycelium. However, the substrate of this invention contains substantial amounts of calcium from the limestone and gypsum powder.

The size and number of mushrooms can be controlled prior to colonization by the amount of substrate that is packed in the bags, with larger bags that contain more substrate producing larger and more mushrooms. For example, eight pound bags will produce ¾ pound mushrooms for approximately 6 months.

Mushroom size and number also can be controlled after colonization by allowing individual colonized units to come into contact with each other. The individual units will form one large continuous unit forming larger and more numerous mushrooms than an individual unit.

Fully colonized units can be placed on shelving or strung on rods to maximize production per unit area.

The following example illustrates the use of this invention using the optimum amounts set forth above.

EXAMPLE

The water is boiled in a 60 gallon capacity steam kettle with a bottom spigot. The potatoes are sliced and then added to the boiling water together with the milk, garlic, corn gluten meal, wheat germ oil, sunflower oil, molasses, hulled sunflower seed, brewer's yeast powder and soybean meal. The mixture is then boiled until all components break into small pieces. The mixture is preferably mixed with a portable paint mixer to help break clumps into small pieces. Maple pea sprouts are then added to the boiling mixture, which is stirred with a large paddle until the sprouts are soft. The oat grain, barley grain and sorghum grain are then added, together with sufficient water only to cover the grain. The mixture is then boiled and stirred until the water level falls below the grain level by 3 to 4 inches and the heat source is then turned off. After approximately one hour, any remaining liquid is drawn off from the bottom of the pot. At this point, the grain should be half-cooked and semi-hard. The grain is then allowed to cool for approximately 24 hours, at which time it is removed from the pot.

Two batches of grain are then placed in a large flat bin and the limestone powder, gypsum powder and cottonseed meal are mixed with the grain until all the grain is coated with powder. The grain should appear coated and should not stick in clumps. Two batches will yield approximately 1,200 pounds of prepared substrate.

The prepared substrate is then packed into double polypropylene plastic bags (1.5 mil.). Each of these double bag units has a polypropylene collar, a cotton plug and an aluminium foil cover over the plug. The bags from 4 batches of the grain (approximately 2,400 pounds) are then loaded in a steam retort (5 foot diameter, 13 feet long) and steam-sterilized at 250° F., 15 pounds per square inches steam pressure for 7 hours. Each load is then cooled for 24 hours before seeding.

After the bags of substrate have been sterilized, they are preferably seeded under sterile conditions in laminar airflow hoods. Seeding is accomplished by introducing pure spawn or, preferably, colonized grain from previous production runs. Approximately 5 to 10 tablespoons of colonized grain is added into each 2-pound bag. Each of the bags is then shaken to mix the colonized grain throughout the new unit. This thorough mixing of the previously colonized grain with the substrate reduces the normal incubation time considerably. Thus, a 2-pound bag will usually be fully colonized after approximately 3 weeks of incubation at 80° F. Usually 15 new 2-pound units may be started from each colonized 2-pound unit. The preferred size of bag is 8 pounds because of the disproportionately greater number of buds per 8 pound bag when compared with 2 pound and 4 pound bags.

After approximately 3 weeks, the grain substrate will be mostly or completely digested, leaving only the mycelium in the bag. The bag can be retained in the mycelial stage for approximately 3 to 4 months for shipment or storage. When mushroom production is desired, the bags containing the mycelium are subjected to a cold shock by chilling them at 40° to 65° F for 5 to 15 days under cool white fluorescent lighting of 25 to 100 lux. The preferred cold shock is at a temperature of 45° F for 7 to 9 days, although a cold water bath for 24 to 48 hours also may be used.

The bags can be shipped in a refrigerated container during this cold shock stage.

As an alternative to the cold shock method of inducing fruiting, the mycelium may be removed from the bags and exposed to an intermittent cold water mist. It is preferred that the misting take place during daylight hours and also during a 2 hour period during the night. The water used for misting is chilled to 50 to 75° F and misting occurs for 2 to 120 seconds at 2 to 10 minute intervals for 6 to 15 hours during the daylight period. Approximately 10 to 20 days after the mycelium is exposed to mist, shiitake mushrooms may be harvested. Subsequent crops from the bags may occur 20 to 30 days apart. The relative humidity in the misting environment must be at least 80%.

As an alternative to the intermittent chilled water mist, the mycelium may be removed from the bags and allowed to fruit using previously known methods.

After the substrate has been spent, it may be used for other purposes, such as compost, animal feed, mushroom compost for other mushrooms or insect feed.

After formation of the mycelium, but before fruiting, the mycelium also may be used as animal feed or for human food. Useful biochemicals also may be extracted from the mycelium.

Although the foregoing invention has been described in some detail by way of illustration and example for purposes of clarity of understanding, it will be obvious that certain changes and modifications may be practiced within the scope of the invention, as described in the claims. For example, and not by way of limitation, the substrate described herein is suitable for growing many species of mushrooms, including those listed in Mushroom List 1, by and many genera of fungi, including those listed in Fungal List 2. Many of these fungi are useful for their biochemical or other properties. Thus, the substrate can be used for growing penicillin mold, weed molds, yeasts and medicinal mushrooms. Accordingly, no limitation is to be inferred except as set forth in the claims.

| MUSHROOM LIST 1 | |
|---|---|
| Scientific Name | Common Name |
| *Agaricus arvensis* | Horse Mushroom |
| *Agaricus augustus* | The Prince |
| *Agaricus bernardii* | |
| *Agaricus bisporus* | |
| *Agaricus bitorquis* | |
| *Agaricus campestris* | Common Field Mushroom |
| *Agaricus excellans* | |
| *Agaricus langei* | |
| *Agaricus macrosporus* | |

MUSHROOM LIST 1

| Scientific Name | Common Name |
|---|---|
| *Agaricus silvaticus* | |
| *Agaricus silvicola* | Wood Mushroom |
| *Agaricus vaporarius* | |
| *Agrocybe aegerita* | Brown Swordbelt |
| *Armillaria Caligata* | |
| *Armillaria ponderosa* | |
| *Armillariella mellea* | |
| *Armillariella tabescens* | |
| *Auricularia polytricha* | Wood Ear |
| *Auricularia auricula* | Wood Ear |
| *Calvatia craniformis* | Skull-shaped Puffball |
| *Calvatia gigantea* | Giant Puffball |
| *Clitocybe geotrapa* | — |
| *Coprinus comatus* | Shaggy Inky Cap |
| *Dictyphora duplicata* | Netted Stinkhorn |
| *Flammulina velutipes* | Enoki |
| *Galerina mutabilis* | — |
| *Ganoderma lucidum* | Reishi |
| *Grifola frondosa* | Hen of the Woods |
| *Grifola ungellata* | Zhu Ling |
| *Hericium coralloides* | Pom Pom |
| *Hericium erinaceus* | — |
| *Laetiporus sulphureus* | Sulfur Polypore |
| *Lentinus edodes* | Shiitake |
| *Lepiota naucina* | Smooth Lepiota |
| *Lepiota procera* | Parasol Mushroom |
| *Lepiota rachodes* | Scaly Lepiota |
| *Lepista nuda* | Wood Blewit |
| *Leucopaxillus giganteus* | — |
| *Lycoperdon gemmatum* | Gem-Studded Puffball |
| *Lycoperdon pyriforme* | Pear-Shaped Puffball |
| *Lyophyllum decastes* | Honshimeji |
| *Lyophyllum ulmarium* | |
| *Macrolepiota procera* | Parasol |
| *Marasmius oreades* | Fairy Ring |
| *Morchella angusticeps* | Black Morel |
| *Morchella deliciosa* | |
| *Morchella esculenta* | White Morel |
| *Morchella conica* | Conical Morel |
| *Morchella crassipes* | Thick-Footed Morel |
| *Morchella elata* | |
| *Morchella semilibera* | |
| *Morchella vulgaris* | Common Morel |
| *Panellus serotinus* | |
| *Panus sp.* | |
| *Pholiota adiposa* | Fat Pholiota |
| *Pholiota nameko* | Nameko |
| *Pleurotus columbinus* | Blue Oyster |
| *Pleurotus cornucopiae* | Canary |
| *Pleurotus cystidiosus* | Abalone |
| *Pleurotus eryngii* | — |
| *Pleurotus flabellatus* | Pink Oyster |
| *Pleurotus florida* | Florida Oyster |
| *Pleurotus ostreatus* | Oyster |
| *Pleurotus pulmonarius* | — |
| *Pleurotus sajor-caju* | Phoenix |
| *Pleurotus salmoned stramineus* | — |
| *Sparassis crispa* | Cauliflower |
| *Stropharia rugosoannulata* | Wine Red Stropharia |
| *Tremella fusciformis* | White Jelly |
| *Tricholomopsis rutilans* | |
| *Volvariella bakeril* | — |
| *Volvariella bombycina* | — |
| *Volvariella volvacea* | Paddy Straw |

FUNGAL LIST 2
List of Fungal Genera That May be Grown on the Substrate

| | |
|---|---|
| Abortiporus | Amylostereum |
| Absidia | Anomoporia |
| Achlya | Antrodia |
| Acremonium | Apiotrichum |
| Acrophialophora | Arachnomyces |
| Acrospeira | Armillariella |
| Actinomucor | Arthrinium |
| Agaricus | Arthrobotrys |
| Agrocybe | Arthrographis |
| Aleurodiscus | Ascotricha |
| Allescheria | Ashbya |
| Alternaria | Aspergillus |
| Alysidium | Athelia |
| Amanita | Aureobasidium |
| Amauroascus | Auricularia |
| Amylomyces | |
| Backusella | Boletus |
| Beauveria | Bondarzewia |
| Bispora | Botryodiplodia |
| Bjerkandera | Botryotrichum |
| Blakeslea | Botrytis |
| Blastomyces | Bovista |
| Boletopsis | Byssochlamys |
| Cadophora | Coccospora |
| Calbovista | Cochliobolus |
| Calcarisporium | Colletotrichum |
| Caldariomyces | Collybia |
| Calocera | Columnocystis |
| Calocybe | Conidiobolus |
| Calonectria | Coniella |
| Calvatia | Coniophora |
| Camarops | Coniothyrium |
| Candida | Conoplea |
| Cantharellus | Coprinus |
| Celphalosporium | Cordyceps |
| Cephaliophora | Coridus |
| Cephaloascus | Coriolus |
| Ceratocystis | Corticium |
| Cercospora | Cortinarius |
| Cerinomyces | Coryne |
| Ceriosporopsis | Corynespora |
| Cerrena | Coryneum |
| Chaetomella | Craterellus |
| Chaetomium | Craterellus |
| Chalara | Crebrothecium |
| Chalaropsis | Cryphonectria |
| Choanephora | Cryptococcus |
| Chondrostereum | Cryptoporus |
| Chroogomphus | Cryptosporiopsis |
| Chrysosporium | Cunninghamella |
| Circinella | Curvularia |
| Cladosportium | Custingophora |
| Clavariadelphus | Cyanthus |
| Claviceps | Cylindrocarpon |
| Clavicorona | Cylindrocephalum |
| Clavispora | Cylindrocladium |
| Clavulina | Cystostereum |
| Clitocybe | Cytospora |
| Clitopilus | Cytospora |
| Dacrymyces | Dictyostelium |
| Dacryopinax | Diheterospora |
| Dactylium | Diplocarpon |
| Daedalea | Diplodia |
| Debaryomyces | Discina |
| Dekkera | Discula |
| Dendryphion | Ditiola |
| Dentinum | Doratomyces |
| Dermaloma | Dothistroma |
| Dichomitus | Drechslera |
| Echinodontium | Epicoccum |
| Elsinoe | Eupenicillium |
| Emericella | Eutypa |
| Emericellopsis | Exophiala |
| Entoloma | |
| Favolus | Flammulina |
| Femsjonia | Fomes |
| Filobasidium | Fomitopsis |
| Fistulina | Fusarium |
| Flammula | Fuscoboletinus |
| Ganoderma | Gnomonia |
| Geotrichum | Gomphidius |
| Gerlachia | Gomphus |
| Gibberella | Grandinia |
| Gilmaniella | Graphium |
| Gliocladium | Grifola |
| Gliomastrix | Guepiniopsis |

FUNGAL LIST 2
List of Fungal Genera That May be Grown on the Substrate

| | |
|---|---|
| Gloeophyllum | Gymnopilus |
| Gloeoporus | Gyrodon |
| Gloeosporium | Gyromitra |
| Glomerella | Gyroporus |
| Hanseniaspora | Humicola |
| Hansenula | Humicolopsis |
| Haploporous | Hyalodendron |
| Helicostylum | Hydnum |
| Helminthosporium | Hygrophoropsis |
| Helvella | Hygrophorus |
| Hendersonula | Hymenochaete |
| Hericium | Hyphopichia |
| Heterobasidion | Hypomyces |
| Hirschioporus | Hypomyces |
| Hormodendrum | Hypoxylon |
| Incrustoporia | Irpex |
| Inocybe | Isaria |
| Inonotus | Ishnoderma |
| Kloeckera | Kluyveromyces |
| Laccaria | Lenzites |
| Lactarius | Leptosphaerulina |
| Laetisaria | Leucopaxillus |
| Laurilia | Libertella |
| Leccinum | Linderina |
| Lentinellus | Lipomyces |
| Lentinula | Lycoperdon |
| Lentinus | Lyophyllum |
| Lentodium | |
| Macrophomina | Monascus |
| Mammaria | Monilinia |
| Marasmiellus | Monochaetia |
| Marasmius | Monodictus |
| Melanconium | Monosporium |
| Melanoleuca | Mortierella |
| Memnoniella | Mucor |
| Meruliopsis | Myceliophythora |
| Merulius | Mycena |
| Merulius | Mycocentrospora |
| Metarrhizium | Mycosphaerella |
| Metschnikowia | Myriococcum |
| Micronectriella | Myrothecium |
| Mollisia | |
| Naematoloma | Neurospora |
| Nectria | Nodulisporium |
| Neocosmospora | Nomuraea |
| Odontia | Oosprridium |
| Oedocephalum | Ophiostoma |
| Oidiodendron | Osmoporus |
| Omphalotus | Ostenia |
| Onnia | Oudemansiella |
| Pachybasium | Phylloporus |
| Pachysolen | Physarum |
| Paecilomyces | Phytophthora |
| Panellus | Pichia |
| Panus | Piptoporus |
| Papularia | Piricularia |
| Papulaspora | Pithomyces |
| Pellicularia | Pleurocybella |
| Penicillium | Pleurotus |
| Peniophora | Plicatura |
| Perenniporia | Pluteus |
| Periconia | Podospora |
| 7Pestalotia | Polyozellus |
| Pestalotiopsis | Polyporus |
| Peziza | Poria |
| Phaeocoriolellus | Potebniamyces |
| Phaeolus | Preussia |
| Phanerochaete | Psathyrella |
| Phellinus | Pseudeurotium |
| Phialomyces | Pseudofusarium |
| Phialophora | Pseudohydnum |
| Phlebia | Pseudospiropes |
| Phlogiotis | Ptychogaster |
| Pholiota | Pulcherricium |
| Phoma | Pycnoporus |
| Phoma | Pyrenochaeta |
| Phomopsis | Pyrenophora |
| Phycomyces | Pythium |
| Radulodon | Rhizopus |
| Ramaria | Rhodosporidium |
| Ramaricium | Rhodotorula |
| Resinicium | Rigdoporus |
| Retinocyclus | Robillarda |
| Rhinocladiella | Rosellinia |
| Rhizoctonia | Russula |
| Rhizomucor | |
| Saccharomyces | Sphaceloma |
| Saccharomycopsis | Spicaria |
| Sacodon | Spiroidium |
| Saprolengnia | Spondylocladium |
| Sarcosphaera | Spongipellus |
| Schizophyllum | Sporidesmium |
| Schizosaccharomyces | Sporidiobolus |
| Schwanniomyces | Sporobolomyces |
| Sclerotinia | Sporothrix |
| Sclerotium | Sporotrichum |
| Scolecobasidium | Stachybotrys |
| Scopulariopsis | Staurophoma |
| Scytalidium | Steccherinum |
| Scytinostroma | Stemphylium |
| Sebacina | Stereum |
| Sepedonium | Stibella |
| Septomyxa | Strobilomyces |
| Septoria | Stromatinia |
| Seroula | Suillus |
| Sirodesmium | Syncephalastrum |
| Sistotrema | Syringospora |
| Sordaria | |
| Talaromyces | Tricellua |
| Taphrina | Trichocladium |
| Termitomyces | Trichoderma |
| Tetracladium | Tricholoma |
| Thamnidium | Trichophyton |
| Thamnostylum | Trichosporon |
| Thanatephorus | Trichothecium |
| Thermoascus | Trichurus |
| Thermomyces | Tridentaria |
| Thielavia | Trigonopsis |
| Thielaviopsis | Truncatella |
| Torulaspora | Tuber |
| Torulopsis | Tympanis |
| Trametes | Tyromyces |
| Tremella | |
| Ulocladium | Utilago |
| Valsa | Verticicladiella |
| Valsaria | Verticillium |
| Vararia | Volucrispora |
| Verpa | Volutella |
| Wallemia | Whetzelinia |
| Wardomyces | |
| Xeromphalina | Xylobolus |
| Xylaria | Xylogone |
| Yarrowia | Yeasts |
| Zalerion | Zygosaccharomyces |
| Zygodesmus | Zygosporium |
| Zygorhynchus | Zythia |

What is claimed is:

1. A method for culturing tree mushrooms on a substantially cellulose free medium, comprising:
   preparing a grain mixture by mixing water in approximately one to one-fourth parts by weight per part of a dry mixture containing a major portion of grain and minor portions of starch, protein and nutrient sources;
   boiling said grain mixture for approximately 1 hour;
   cooling said grain mixture for approximately 8 to 24 hours;
   introducing said grain mixture into a microorganism impermeable sterilizable container;
   sterilizing said container and said grain mixture;

introducing tree mushroom spawn into said grain mixture;

shaking said container to mix said tree mushroom spawn throughout said grain mixture;

incubating said tree mushroom spawn in said container to allow said tree mushroom spawn to consume said grain mixture and to form mycelium; and inducing said mycelium to fruit, whereby tree mushroom fruiting bodies are formed; and harvesting said fruiting bodies.

2. A method for culturing tree mushrooms, according to claim 1, further comprising:

mixing a permeability improving additive into said grain mixture during said cooling step.

3. A method for culturing tree mushrooms, according to claim 1, wherein:

said grain comprises:

sorghum grain.

4. A method for culturing tree mushrooms, according to claim 1, wherein:

said protein comprises maple pea sprouts.

5. A method for culturing tree mushrooms, according to claim 1, wherein:

said sterilizing step is accomplished by steam sterilizing said container and said grain mixture at a temperature of approximately 250° F. and a pressure of approximately 15 pounds per square inch, for approximately 7 hours.

6. A method for culturing tree mushrooms, according to claim 1, wherein said tree mushroom spawn comprises:

grain that has been previously colonized with tree mushroom spawn.

7. A method for culturing tree mushrooms, according to claim 1, wherein:

said inducing step is accomplished by removing said mycelium from said containers and exposing said mycelium to an intermittent cold water mist.

8. A method for culturing tree mushrooms, according to claim 1, wherein said intermittent cold water mist is accomplished by using water chilled to 50° to 75° F. for 2 to 120 seconds at 2 to 10 minute intervals for 6 to 15 hours during daylight hours and for 2 hours at night.

9. A method for culturing tree mushrooms according to claim 1, wherein:

said starch, protein and nutrient sources are preselected to meet the nutritional requirements of said mushrooms.

10. A method for culturing tree mushrooms according to claim 1, further comprising adding whole garlic to said grain mixture before said boiling step.

11. A method for culturing tree mushrooms according to claim 1, wherein:

said tree mushroom spawn is shiitake mushroom spawn.

12. A method for culturing tree mushrooms according to claim 1, wherein:

said tree mushroom spawn is oyster mushroom spawn.

13. A method for culturing tree mushrooms, according to claim 1, wherein:

said protein comprises bean sprouts.

14. A method for culturing mushrooms according to claim 1, further comprising:

retaining said mycelium for approximately 3 to 4 months after said incubating step.

15. A method for culturing tree mushrooms, according to claim 14, wherein:

said cold shock is accomplished by chilling said containers at approximately 40° to 65° Fahrenheit for 5 to 15 days.

16. A method for culturing tree mushrooms, according to claim 14, wherein:

said cold shock is accomplished by a cold water bath for 24 to 48 hours.

17. A method for culturing tree mushrooms, according to claim 1, wherein:

said inducing step is accomplished by cold shocking said containers.

18. A method for culturing tree mushrooms on a substantially cellulose free medium, comprising:

preparing a grain mixture by mixing water in approximately one to one-fourth parts by weight per part of a dry mixture containing a major portion of grain and minor portions of starch, protein and nutrient sources;

boiling said grain mixture for approximately 1 hour;

cooling said grain mixture for approximately 8 to 24 hours;

introducing said grain mixture into a microorganism impermeable sterilizable container;

sterilizing said container and said grain mixture;

introducing tree mushroom spawn into said grain mixture;

shaking said container to mix said tree mushroom spawn throughout said grain mixture;

incubating said tree mushroom spawn in said container to allow said tree mushroom spawn to consume said grain mixture and to form mycelium;

chilling said container and said mycelium for 7 to 9 days at a temperature of approximately 45 degrees fahrenheit;

removing aid mycelium from said containers;

intermittently misting said mycelium with chilled water until tree mushrooms of the desired size are gown, whereby tree mushroom fruiting bodies are formed; and harvesting said fruiting bodies.

19. A method for culturing mushrooms, comprising:

boiling between 25 and 35 gallons of water;

adding between 5 and 20 pounds of Russet potatoes, between 2 and 35 pounds of brewer's yeast powder and between ½ and 4 pounds of garlic to form an intermediate mixture;

boiling said intermediate mixture using a heat source;

mixing said intermediate mixture to break clumps into small pieces;

adding between 150 and 300 pounds of whole sorghum grain and between ½ and 15 pounds of rolled barley grain to form a grain mixture;

adding a sufficient amount of water to immerse said grain mixture;

boiling and stirring said grain mixture only until the water level falls below said grain mixture level;

removing said heat source;

approximately one hour after removal of said heat source, draining said grain mixture;

approximately 8 to 24 hours after said draining step, mixing said grain mixture with between 12 and 37 pounds of limestone powder and 50 to 100 pounds of gypsum powder until said grain mixture is completely coated;

introducing measured portions of said grain mixture into sterilizable microorganism impermeable containers;

sterilizing said sterilizable microorganism impermeable containers and said grain mixture;
introducing mushroom spawn into said grain mixture;
mixing said mushroom spawn throughout said grain mixture;
incubating said mushroom spawn in said container to allow said mushroom spawn to consume said grain mixture and to form mycelium; and
inducing said mycelium to fruit.

20. A method for culturing mushrooms, according to claim 19, wherein said mushroom spawn is hiitake mushroom spawn.

21. A method for culturing mushrooms, according to claim 19, wherein said mushroom spawn is oyster mushroom spawn.

22. A method for culturing mushrooms, according to claim 19, wherein said mushroom spawn is button mushroom spawn.

23. A method for culturing mushrooms, according to claim 19, wherein said mushroom spawn is paddy straw mushroom spawn.

24. A method for culturing mushrooms, according to claim 19, wherein said mushroom spawn is enoki mushroom spawn.

* * * * *